United States Patent [19]

Rival et al.

[11] Patent Number: 4,857,150

[45] Date of Patent: Aug. 15, 1989

[54] SILICONE OIL RECOVERY

[75] Inventors: Steven E. Rival, York, S.C.; William D. Prince, Charleston, W. Va.

[73] Assignee: Union Carbide Corporation, Danbury, Conn.

[21] Appl. No.: 209,907

[22] Filed: Jun. 22, 1988

[51] Int. Cl.⁴ .......................... B01D 3/06; B01D 3/10
[52] U.S. Cl. ......................................... 203/41; 203/88; 203/91; 203/DIG. 25; 210/664; 210/694; 210/909
[58] Field of Search ............. 203/41, 88, 91, DIG. 25; 202/176, 205; 159/2.1; DIG. 16; 208/262.5; 210/664, 694, 909

[56] References Cited

U.S. PATENT DOCUMENTS

| | | | |
|---|---|---|---|
| 4,227,972 | 10/1980 | Hernandez et al. | 203/80 |
| 4,299,704 | 11/1981 | Poss | 210/909 |
| 4,405,448 | 9/1983 | Googin et al. | 210/909 |
| 4,477,354 | 10/1984 | Fessler | 203/36 |
| 4,498,992 | 2/1985 | Garrett, Jr. | 210/664 |
| 4,517,094 | 5/1985 | Beall | 210/664 |
| 4,518,503 | 5/1985 | Fermaglich | 210/664 |
| 4,526,677 | 7/1985 | Grantham et al. | 210/909 |
| 4,578,194 | 3/1986 | Reinartz et al. | 210/909 |
| 4,623,464 | 11/1986 | Ying et al. | 210/909 |
| 4,699,667 | 10/1987 | Walsh | 210/909 |
| 4,738,780 | 4/1988 | Atwood | 210/909 |
| 4,744,905 | 5/1988 | Atwood | 210/674 |
| 4,764,256 | 8/1988 | Way | 203/46 |

FOREIGN PATENT DOCUMENTS 1005269  1/1976  Japan .................. 210/664

Primary Examiner—David L. Lacey
Assistant Examiner—V. Manoharan
Attorney, Agent, or Firm—Saul R. Bresch

[57] ABSTRACT

A process for the recovery of silicone oil and chlorobenzenes from a mixture containing silicone oil, chlorobenzenes, and polychlorinated biphenyls comprising:

(a) introducing the mixture into a distillation zone at a temperature and a pressure which will cause the chlorobenzenes to flash overhead and the mixture of silicone oil and polychlorinated biphenyls to pass to the bottom of the zone; and (b) removing the bottoms from step (a), cooling same, and passing the bottoms through at least one bed of activated carbon, which is an adsorbent for polychlorinated biphenyls.

14 Claims, 1 Drawing Sheet

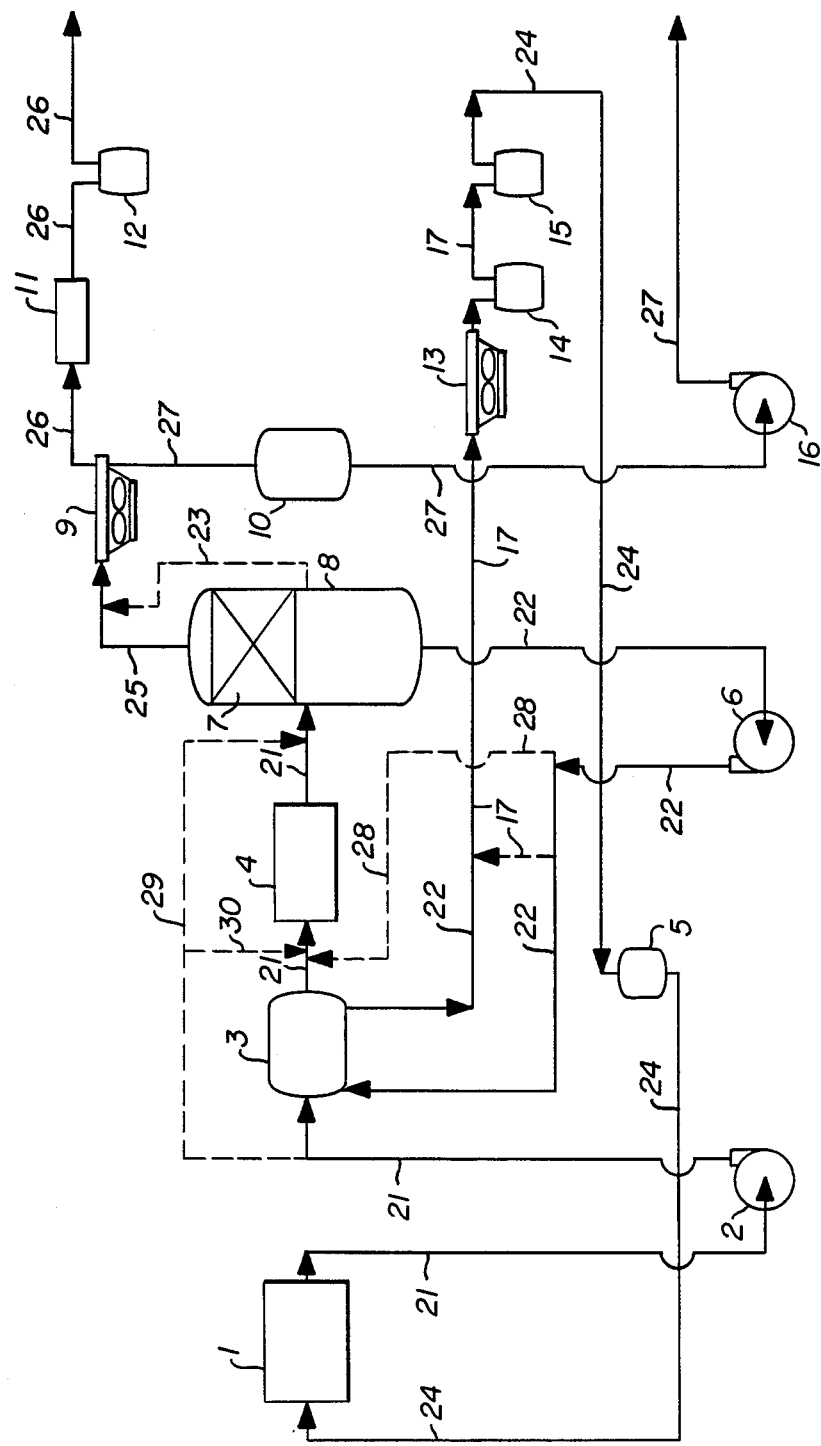

SILICONE OIL RECOVERY

TECHNICAL FIELD

This invention relates to the recovery of silicone oil from a mixture of same together with polychlorinated biphenyls and chlorobenzenes.

BACKGROUND ART

Askarels, which are mixtures of polychlorinated biphenyls (PCB's) and chlorobenzenes, were commonly used as dielectric liquid coolants in electrical induction apparatus such as transformers for many years until it was realized that the PCB's represented an environmental and physiological hazard. Since the replacement of these PCB containing transformers as well as the disposal of the contaminated transformers together with the PCB's is an expensive undertaking, various processes have been proposed to preserve and decontaminate the transformers by replacing the PCB's with a safe dielectric liquid coolant. The dielectric liquid coolants of choice are the silicone oils, particularly trimethylsilyl end-blocked poly-dimethylsiloxanes), which have the following formula:

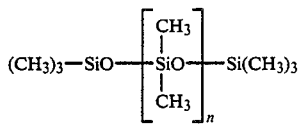

wherein n is of a value sufficient to provide an acceptable viscosity, e.g., a viscosity at 25° C. of about 50 centistokes or less. One process for the replacement of askarels with silicone oil is described in United States patent application Ser. No. 739,775, filed on June 3, 1985, now U.S. Pat. No. 4,744,905, issued on May 17, 1988, which is incorporated by reference herein. It will be seen from this patent application that the askarels become trapped in the cellulose interstices of the transformers and that chlorobenzenes or other interim dielectric fluids and silicone oil are used to leach out the PCB's over time. Thus, mixtures of silicone oil, chlorobenzenes, and PCB's are continuously removed from the transformer in order to reduce the PCB elution rate to an acceptable number. A typical mixture, as removed from the transformer, contains about 4 to 13 percent by weight chlorobenzenes, about 0.05 to about 0.15 percent by weight PCB's (500 to 1500 ppm), and the balance silicone oil. The percentages by weight are based on the total weight of the mixture. The silicone oil and the chlorobenzenes, of course, represent valuable commodities provided, however, that the PCB's are removed.

It has been suggested to pass the mixture of silicone oil, chlorobenzenes, and PCB's through a bed or a series of beds of activated carbon, which would adsorb the PCB's. The activated carbon is not selective for the PCB's, however, and also adsorbs the chlorobenzenes. Unfortunately, such a large quantity of activated carbon is required to adsorb both the chlorobenzenes and the PCB's that the process becomes uneconomical. If the activated carbon adsorption is accomplished by passing the mixture through drums of activated carbon, the economies become even poorer because of the need for excessive drum handling. In addition, once the chlorobenzenes and the PCB's are adsorbed onto the activated carbon, the chlorobenzenes cannot be recovered, at least in a way that is commercially feasible.

DISCLOSURE OF THE INVENTION

An object of the invention, therefore, is to provide a process for the recovery of silicone oil from a mixture of silicone oil, chlorobenzenes, and PCB's whereby (i) little or no chlorobenzenes are passed through the activated carbon bed thus reducing the quantity of activated carbon required to economical proportions, and, further, (ii) the chlorobenzenes are advantageously recovered.

Other objects and advantages will become apparent hereinafter.

According to the present invention, then, a process has been discovered for the recovery of silicone oil and chlorobenzenes from a mixture containing silicone oil, chlorobenzenes, and PCB's comprising (a) introducing the mixture into a distillation zone at a temperature and pressure, which will cause the chlorobenzenes to flash overhead and the mixture of silicone oil and PCB's to pass to the bottom of the zone; and (b) removing the bottoms from step (a), cooling same, and passing the bottoms through a bed of activated carbon, which is an adsorbent for PCB's.

BRIEF DESCRIPTION OF THE DRAWING

The sole FIGURE of the drawing is a schematic flow diagram of an illustrative embodiment of the invention.

DETAILED DESCRIPTION

The mixture of silicone oil, chlorobenzenes, and PCB's generally contains about 0.75 to about 20 parts by weight of chlorobenzenes, and about 0.01 to about 0.25 part by weight of PCB's, each per 100 parts by weight of silicone oil. The chlorobenzenes are typically a mixture of tri- and tetra-chlorobenzenes. The activated carbon, which is used as the adsorbent, is preferably a coal-based activated carbon.

Referring to the drawing:

The mixture of silicone oil, chlorobenzenes, and PCB's is removed from transformer 1 along line 21 by pump 2 and pumped through line 21 to preheater 3 and heater/reboiler 4 from which it enters vessel 8. Vessel 8 can be either a flash vessel, i.e., a vapor/liquid separator, or a distillation column. As a flash vessel, section 7 can be either open or contain a demisting element. If vessel B is a distillation column, section 7 can contain trays or packing, which are not used, and the bottom part of vessel 8 acts as a flash vessel. In any case, vessel 8 is referred to in this specification as a distillation zone. In an alternative mode, the mixture is pumped along line 29 directly into vessel 8 at ambient temperature. In this situation, heat is supplied via recirculation through lines 22 and 28 and heater/reboiler 4. Another technique when treating cold feed is to employ a thin film evaporator as vessel 8 with external heating.

Preheater 3 is a heat exchanger and heater/reboiler 4 contains a heating device. The temperature of the mixture is raised by both these units from ambient to a temperature in the range of about 180° C. to about 230° C., and preferably in the range of about 200° C. to about 225° C. This temperature can be referred to as the inlet temperature or the temperature in the distillation zone. The preheater is heated by heat exchange with the bottoms of vessel 8 passing through line 22 and pump 6. While preheater 3 can be omitted, it does improve the energy efficiency of the process, and using same is the preferred mode.

The heated mixture, at the inlet temperature, enters vessel 8 through line 21 where the pressure is maintained in the range of about 2 to about 50 millimeters of mercury and preferably about 5 to about 15 millimeters. The combined heat and pressure cause part of the mixture to flash (or evaporate) and the balance of the mixture to flow downward through vessel 8 as bottoms. The overhead (or distillate) is comprised of about 85 to about 99 percent by weight chlorobenzenes, about 0.01 to about 5 percent by weight PCB's, and about 1.5 to about 10 percent by weight silicone oil, based on the weight of the distillate. The bottoms contain about 99.5 to about 99.9 percent by weight silicone oil, about 0.01 to about 0.2 percent by weight PCB's, and about 200 to about 5000 ppm by weight chlorobenzenes, based on the weight of the bottoms. About 10 to about 50 percent by weight of the total PCB's finds its way into the distillate and about 50 to about 90 percent by weight of the PCB's into the bottoms. The location of the PCB's depends on the nature of the PCB's. The lower the amount of chlorine in the PCB's, the lower the boiling point and the lower the molecular weight. Conversely, the higher the amount of chlorine in the PCB's, the higher the boiling point and the higher the molecular weight. Thus, in general, the lower the amount of chlorine, the greater the amount of PCB's in the overhead while a greater amount of chlorine in the PCB's means that there will be more PCB's in the bottoms.

In the case where the cold mixture is pumped from transformer 1 along lines 21 and 29, heat is supplied by recycling part of the bottoms through line 22, pump 6, line 28, and heater/reboiler 4. The cold mixture and the hot recycled bottoms (reboiler liquid) meet just outside of vessel 8 in line 21 where at least part of the mixture flashes, the balance flashing in vessel 8. Alternatively, the cold mixture can be pumped into the lower portion of section 7 and, as it descends in vessel 8, the mixture contacts the hot recycled bottoms from line 21, and flashes. In both of these cases, there is no preheater and vessel 8 is a distillation column. The cold mixture is at a temperature in the range of about 20° C. to about 50° C.; the hot reboiler liquid is at a temperature in the range of about 180° C. to about 230° C. and preferably about 200° C. to about 225° C.; and the pressure in vessel 8 is in the range of about 2 to about 50 millimeters of mercury and preferably about 5 to about 15 millimeters. Another alternative is for the feed mixture to enter line 21 upstream of the heater/reboiler 4. Then, the feed from line 29 goes into line 30.

The temperature in vessel 8 is maintained below the decomposition temperature of the silicone oil, the PCB's, and the chlorobenzenes. This is important because as temperatures rise above 230° C., for example, the PCB's and chlorobenzenes increasingly decompose to hydrochloric acid, which poses attendant corrosion problems.

The balance of the bottoms either passes from line 22 through preheater 3 and then on to cooler 13 through line 17 or, in the case where preheater 3 is not used, directly to cooler 13 via line 17. In cooler 13, the mixture of silicone oil and PCB's is cooled to a temperature in the range of about 25° C. to about 60° C. and preferably about 25° C. to about 40° C.

The mixture of silicone oil and PCB's then passes into primary carbon cannister 14 and to secondary carbon cannister 15 where the PCB's are adsorbed onto the activated carbon. Each cannister contains one bed of activated carbon. There can be one or more beds, i.e., cannisters or drums of activated carbon, with no upper limit to the number of beds except the bounds of practicality. When there are two or more beds of adsorbent, the beds are connected in series. Usually, two or three beds are used. The silicone oil continues along line 24 to holding tank 5 for eventual recycle back to transformer 1 along line 24.

When primary carbon cannister 14 becomes saturated with PCB's, secondary carbon cannister 15 becomes the primary carbon cannister. At this time, the first primary carbon cannister is removed and a cannister with fresh activated carbon is substituted in its place. This cannister now becomes the secondary carbon cannister. Line 13 then goes directly to cannister 15 and line 17 runs from cannister 15 to cannister 14, and the silicone oil from cannister 14 passes into line 24. The rerouting of the mixture is accomplished using additional lines and valves. In the event that there are more than two cannisters in the series, the first in the series, which is the first to become saturated, is removed and recharged, and takes its place as the last in the series; the second cannister in the series becomes the first in the series; and the third becomes the second, etc. The activated carbon containing the adsorbed PCB's is destroyed in some manner such as incineration.

It is found that the cannisters containing activated carbon saturated with PCB's also contain a considerable amount of silicone oil. A major proportion of the silicone oil can be recovered by draining the cannister and pumping the balance out of the cannister or by blowing free with dry nitrogen or air.

Since moisture in the silicone oil can cause short circuits in the transformer, it is recommended that molecular sieves, which will adsorb moisture, be mixed in with the activated carbon in cannisters 14 and 15. This would avoid removing the moisture from the silicone oil by vacuum stripping. Examples of molecular sieves, which are suitable for the purpose are $K_{12}(AlO_2 SiO_2)_{12}$ and $Na_{12}(AlO_2 SiO_2)_{12}$. The objective is to reduce the moisture in the silicone oil to 50 parts per million or less.

The flow rate of bottoms through cannisters 14 and 15, when each is 55 gallons in volume, for example, is in the range of about 0.25 to about 5 gallons per minute, and is preferably about 0.5 to about 1.5 gallons per minute. It is found that low flow rates improve economics.

The apparatus can be stationary, i.e., where the transformer fluid is transported to the apparatus, or mobile where the apparatus is brought to the transformer. In any event, the flash distillation reduces (i) the amount of activated carbon required for the adsorption and (ii) cannister or drum handling. The recovery of the chlorobenzenes distillate is also an advantage. When it is allowed to adsorb onto the activated carbon, it has to be incinerated or otherwise destroyed together with the PCB's.

The overhead distillate leaves vessel 8 through line 25 if vessel 8 is a flash vessel or through line 23 if vessel 8 is a distillation column, and is condensed in cooler 9. The non-condensable portion of the overhead is drawn along line 26 by vacuum pump 11 and it then passes through activated carbon cannister 12 where traces of chlorobenzenes and PCB's are adsorbed onto the carbon. The balance of the non-condensables are then vented to the atmosphere.

The condensable portion of the overhead, which is primarily chlorobenzenes, passes through line 27, is recovered in tank 10, and is pumped through pump 16 along line 27 to storage for eventual recovery after separation from traces of PCB's.

The invention is illustrated by the following simulated example in accordance with the process and flow sheet described above.

A flash distillation is performed employing a feed solution of a PCB contaminated silicone oil from transformer 1. The solution is pumped through preheater 3 followed by a flow control valve (not shown), and then into vessel 8. The following conditions are employed:

| | | |
|---|---|---|
| Upstream of control valve | 35 psig | 203° C. |
| Downstream of control valve | 10 mm. Hg | 145° C. |

At these conditions, 6.63 weight percent of the feed is collected as distillate. The following analyses are obtained for the feed and bottoms:

| Component | Feed (Wt. %) | Bottoms (Wt. %) |
|---|---|---|
| 1,2,4-trichlorobenzene | 3.455 | 0.248 |
| 1,2,3-trichlorobenzene | 1.217 | 0.005 |
| 1,2,4,5-tetrachlorobenzene | 0.133 | 0.018 |
| 1,2,3,4-tetrachlorobenzene | 2.189 | 0.299 |
| Total chlorobenzenes | 6.994 | 0.57 |
| PCB's | 0.080 | 0.059 |
| | (800 ppm) | (590 ppm) |
| Silicone Oil | 92.926 | 99.371 |
| | 100.000 | 100.000 |

The concentration of chlorobenzenes is reduced by 91.85 weight percent from the feed solution.

A continuous adsorption run is carried out at about 30° C. employing 8×30 activated carbon. The solution to undergo the adsorption step is a bottoms solution analogous to the above described bottoms. The bottoms are passed through cannisters 14 and 15 at 1.0 gpm.

The ratio (by weight) of bottoms to activated carbon is about 52.6:1. Analyses of the bottoms entering cannister 14 and exiting cannister 15 are given below:

| Component | Bottoms | Exit Solution |
|---|---|---|
| Total chlorobenzenes | 0.75 wt. % | nil |
| PCB's | 871 ppm | 0.088 ppm |

The concentration of PCB's is reduced by 99.99 weight percent from the bottoms.

We claim:

1. A process for the recovery of silicone oil and chlorobenzenes from a mixture containing silicone oil, tri- and/or tetra-chlorobenzenes, and polychlorinated biphenyls comprising:
   (a) introducing the mixture into a distillation zone at a temperature and a pressure, which will cause the chlorobenzenes to flash overhead and the mixture of silicone oil and polychlorinated biphenyls to pass to the bottom of the zone; and
   (b) removing the bottoms from step (a), cooling same, and passing the bottoms through at least one bed containing activated carbon.

2. The process defined in claim 1 wherein the temperature in the distillation zone is in the range of about 180° C. to about 230° C. and the pressure is in the range of about 2 to about 50 millimeters of mercury.

3. The process defined in claim 2 wherein the temperature in the distillation zone is in the range of about 200° C. to about 225° C. and the pressure is in the range of about 5 to about 15 millimeters of mercury.

4. The process defined in claim 2 wherein the mixture is introduced into the distillation zone at a temperature in the range of about 200° C. to about 225° C.

5. The process defined in claim 1 wherein the mixture comprises about 0.75 to about 20 parts by weight of chlorobenzenes and about 0.01 to about 0.25 part by weight of polychlorinated biphenyls, the parts by weight being based upon 100 parts by weight of silicone oil.

6. The process defined in claim 1 wherein there are at least two beds containing activated carbon connected in series.

7. The process defined in claim 1 wherein the mixture is preheated to a temperature in the range of about 180° C. to about 230° C. before it is introduced into the distillation zone.

8. The process defined in claim 7 wherein the mixture is preheated to a temperature in the range of about 200° C. to about 225° C.

9. The process defined in claim 1 wherein the mixture is introduced into the distillation zone at a temperature in the range of about 20° C. to about 50° C. and the flash occurs when the mixture contacts the bottoms, which are at a temperature in the range of about 180° C. to about 230° C.

10. The process defined in claim 1 wherein water-adsorbing molecular sieves are mixed with the activated carbon.

11. A process for the recovery of silicone oil and chlorobenzenes from a mixture containing silicone oil, about 0.75 to about 20 parts by weight tri- and/or tetra-chlorobenzenes, and about 0.01 to about 0.25 part by weight polychlorinated biphenyls, the parts by weight being based on 100 parts by weight of silicone oil, comprising the following steps:
   (a) introducing the mixture into a distillation zone at a temperature in the range of about 180° C. to about 230° C. and a pressure in the range of about 2 to about 50 millimeters of mercury so that the chlorobenzenes flash overhead and the silicone oil and polychlorinated biphenyls pass to the bottom of the zone; and
   (b) removing the bottoms from step (a), cooling same, and passing the bottoms through at least two beds of activated carbon connected in series, said activated carbon being an adsorbent for the polychlorinated biphenyls.

12. A process according to claim 11 wherein said mixture is introduced continuously into said distillation zone while continuously removing chlorobenzenes and said mixture of silicone oil and polychlorinated biphenyls therefrom.

13. A process according to claim 11 wherein the silicone oil is removed from the beds containing activated carbon.

14. A process for the recovery of silicone oil and chlorobenzenes from a mixture containing silicone oil, from about 0.75 to about 20 parts by weight tri- and/or tetra-chlorobenzenes, and from about 0.01 to about 0.25 part by weight polychlorinated biphenyls, the parts by weight being based on 100 parts by weight of silicone oil, comprising:

(a) introducing said mixture into a distillation zone at a temperature in the range of about 200° C. to about 225° C. and a pressure in the range of about 2 to about 50 millimeters of mercury and removing from the distillation zone the chlorobenzenes that flash overhead; and (b) removing a mixture of silicone oil and polychlorinated biphenyl bottoms from the bottom of said distillation zone, cooling same, and passing the bottoms through a series of at least two beds containing activated carbon.

* * * * *